United States Patent [19]

Aiken, Jr.

[11] Patent Number: 4,620,295
[45] Date of Patent: Oct. 28, 1986

[54] METHOD FOR ACCESSING A DATA SET IN A WORD PROCESSING SYSTEM

[75] Inventor: John A. Aiken, Jr., Round Rock, Tex.

[73] Assignee: International Business Machines Corporation, Armonk, N.Y.

[21] Appl. No.: 586,594

[22] Filed: Mar. 6, 1984

[30] Foreign Application Priority Data

Mar. 7, 1983 [JP] Japan ................................. 58-36087

[51] Int. Cl.⁴ ............................................... G06F 1/00
[52] U.S. Cl. .................................................... 364/900
[58] Field of Search ....................... 364/900 MS File

[56] References Cited

U.S. PATENT DOCUMENTS 4,207,609 6/1980 Luiz et al. ........................... 364/200
4,310,883 1/1982 Clifton et al. ...................... 364/200
4,441,829 4/1984 Herbert, Jr. et al. ........... 364/900 X

OTHER PUBLICATIONS

IBM TDB, vol. 23, No. 7A, Dec. 1980, pp. 2968 to 2970, "Method of Reducing Free-Space Fragmentation of a DASD Volume", to Mikkelsen et al.

Primary Examiner—Raulfe B. Zache
Attorney, Agent, or Firm—J. F. Villella, Jr.

[57] ABSTRACT

A word processing system is disclosed in which a text stream is stored on a direct access storage device (DASD) for recall and editing. The text stream is organized into a document, which is stored on the DASD as a data set. The data set consists of an index portion and a portion containing text records. The index portion is divided into nodes, of which the primary node is called the root node. When the system operator designates a data set for use, the root node is fetched and retained in a system memory to eliminate the need to fetch it from the DASD for every access. When sequential records are accessed, such as during a document duplication operation, the index is fully searched only for the first of the sequential records. Subsequent records are located through index nodes already in the system memory, with subsequent index nodes being fetched from the DASD only when the last index entry in the current index node has been processed. When sequential records are written to the DASD, the index is fully searched only for the insertion point for the first record. For subsequent records, the same index node is updated until there is insufficient room for index entry for the latest record written to the DASD. At that time the index node is split and index entries at higher levels of the index are updated in a similar manner.

7 Claims, 20 Drawing Figures

METHOD FOR ACCESSING A DATA SET IN A WORD PROCESSING SYSTEM

DESCRIPTION

1. Technical Field

This invention relates to word processing systems and more particularly to the enhancement of system performance during multiple-record accesses to data stored on a Direct Access Storage Device (DASD).

2. Background Art

One current word processing system use a very simple format for storing and locating documents on its diskette. There are always exactly 32 data sets ("jobs") available on a diskette. Allocation is by diskette track. The entire diskette index used for locating the data sets on the diskette is small enough to be kept in a system memory at one time. The diskette index is copied into the system memory when the diskette is inserted into the drive. Searching and retrieving the index thus does not pose a performance problem.

One of the problems with this approach is that exactly 32 jobs are available per diskette. In general, a word processing system needs to store a variable number of data sets on a diskette volume, and more than 32 data sets should be available for the system operator.

Another problem with this approach is that space on the diskette is allocated to a particular data set on a track basis. Thus, the average wasted space on the diskette (allocated but not actually used to store data) is one-half track for each job that is actually in use, or a maximum of 16 tracks out of the 70 tracks available on a diskette.

Another current word processing system employs a 2-level diskette index, consisting of the diskette index, which shows the location of data sets on the diskette, and one data set index for each existing data set. The diskette index is fixed-sized, and is always kept in system memory. The size of the data set index depends on the size of the data set. Blocks of data set index data are fetched into system memory as required. To locate a page of a document requires searching the data set index from the beginning to the appropriate points in the data set index which show where the page is located on the diskette.

For sequential accesses to a data set (reading consecutive records in the data set), an access method has been implemented which improves performance over the normal record (unit of information retrieval) and page access.

The problem with this approach is that the programming necessary for this special access method requires significant system memory when it is to be used, and it is unique to each type of data set (document, stored records, system setups, and so on).

Another approach in current use has the data set index distributed with the data in the working (non-permanent) storage. Each data block has some control area containing, among other information, the locations of the prior and the next blocks. This means that sequential access is very fast, since the current block always defines the location of the next (and prior) block.

The problem with this approach is that random access (going directly to records in the middle of the data set) is slow, since all prior records must be read. To fix the random-access performance would require another data set index set up for random access.

DISCLOSURE OF THE INVENTION

It is accordingly an object of the present invention to improve the performance of sequential access to stored information in a manner that does not limit the flexibility of a word processing system and in a manner that is independent of the type of data stored.

The foregoing and other objects and advantages are achieved with the present invention. Briefly, a method and apparatus is disclosed for accessing information (fetching information from the DASD and storing information onto the DASD) in a manner that reduces the number of accesses to the data set index. Performance improvement is achieved through two factors.

First, when the first record has been located on the DASD, the data set index is accessed only when the current block is insufficient, rather than one or more times for every record accessed. Second, the data set index is normally located on the DASD in a location which is physically distant from the information. By reducing the accesses to the data set index, the read/write head of the DASD may be kept physically near the information to be accessed, which reduces the time required between record accesses

BEST MODE FOR CARRYING OUT THE INVENTION

Figure 1:
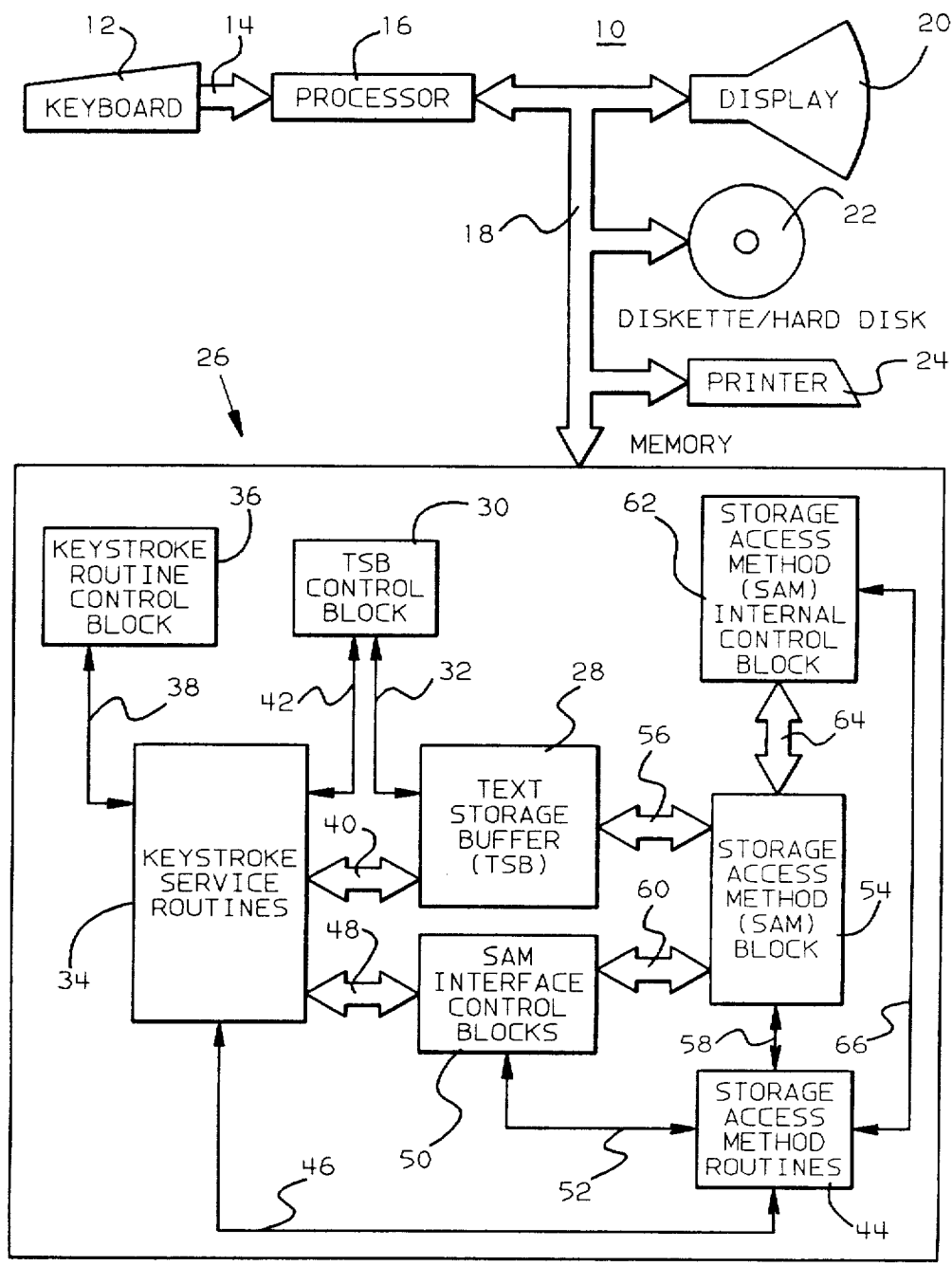
FIG. 1 is a block diagram of the word processing system embodying the present invention.

Referring now to FIG. 1, there is shown a word processing system 10 which includes a keyboard 12 for receiving text and operator commands and transmitting the input through a channel 14 to a processor 16. A memory bus 18 is connected to the processor 16 as well as to a CRT (Cathode Ray Tube) display 20, one or more DASD 22 (such as diskette or hard disk), a printer 24, and a random access type system memory 26.

An operator enters a text stream through the keyboard 12 and each page of text is stored and processed in the memory 26. As the text stream is received in memory 26, it is also presented on the display 20. After the text has been entered into the keyboard 12, it can be stored on the DASD 22 or printed out on the printer 24.

The memory 26 includes a number of data areas and functional programs for operating with the text stored in the system 10. The text and related control functions are stored in a text storage buffer (TSB) 28.

A TSB control block 30 serves as the data area for the TSB 28. Block 30 is connected through a channel 32 to the TSB 28.

As each character is input through the keyboard 12, it is received at the memory 26 through a collection of keystroke service routines 34. A keystroke control block 36 is a data area which selects a predetermined keystroke service routine for processing the received character. Block 36 is linked to the keystroke service routines 34 through channel 38. The keystroke service routines block 34 is further linked through a channel 40 to the TSB 28 and through a channel 42 to the TSB control block 30.

When the TSB control block 30 indicates that text must be moved into or out of TSB 28, this movement request is communicated to the storage access method (SAM) routines 44 via channel 46. The SAM routines 44 serve to control all data movement between the DASD 22 and memory 26. (Corresponding access method routines for the keyboard 12, display 20, and printer 24 are substituted for block 44 when communication with these units is required.) The keystroke service routines 34 communicate further control information and data to the SAM routines 44 through channel 48 to the SAM interface control blocks 50. (Corresponding access method interface control blocks for the keyboard 12, display 20, and printer 24 are substituted for block 50 when communication with these units is required.) Upon completion of the SAM service request, the SAM interface control blocks 50 will contain further information and data to be used by the keystroke service routines 34 for continued processing. The SAM interface control blocks 50 are connected to the SAM routines 44 by a channel 52.

A SAM block 54 is connected via channel 18 with the DASD 22. This block 54 serves as the transfer point for data transfers between the DASD 22 and memory 26. (Corresponding blocks for the keyboard 12, display 20, and printer 24 are substituted for block 54 when communication with these units is required.) The SAM block 54 is connected to the TSB 28 through channel 56. The SAM routines 44 can access data in the SAM block 54 through a channel 60. Block 54 is linked to the SAM interface control blocks 50 through a channel 60 for the purpose of communicating information and data to the keystroke service routines 34.

A SAM internal control block 62 is provided to contain the current status and information regarding the DASD 22. (Corresponding blocks for the keyboard 12, display 20, and printer 24 are substituted for block 62 when communication with these units is required). Information is transferred between the DASD 22 and block 62 through the SAM block 54 by a channel 64. Information in the SAM internal control block 62 is communicated to and managed by the SAM routines 44 through a channel 66. Block 62 serves to store flags and status information as required by the operation of blocks 44 and 54.

The operation of the word processing system 10 is now briefly described with reference to FIG. 1. As the operator enters each keystroke at the keyboard 12 a corresponding signal is transmitted through channel 14 to the processor 16 which enters the keystroke command into the memory 26. Upon receipt of the keystroke command, a keystroke service routine is produced for block 34 to handle the particular command received. The keystroke command is processed according to whether it is a control command or a graphic entry, and the result of the keystroke processing is entered into the TSB 28. As graphics and commands are built up in the TSB 28, the text information is presented at display 20. When the TSB 28 is in danger of being insufficient to hold the necessary text and commands, the keystroke service routines in block 34 will store control information in the SAM interface control blocks 50 to cause the SAM routines 44 to transfer blocks of information (in units called records) to the DASD 22.

Through control commands the operator can transfer information between the memory 26, display 20, DASD 22, and printer 24. Selected pages can be called up from the DASD 22 into the memory 26 so that the operator can make changes and corrections to the text and then re-enter the corrected text into the DASD 22 or have the corrected text printed at the printer 24.

Figure 2:
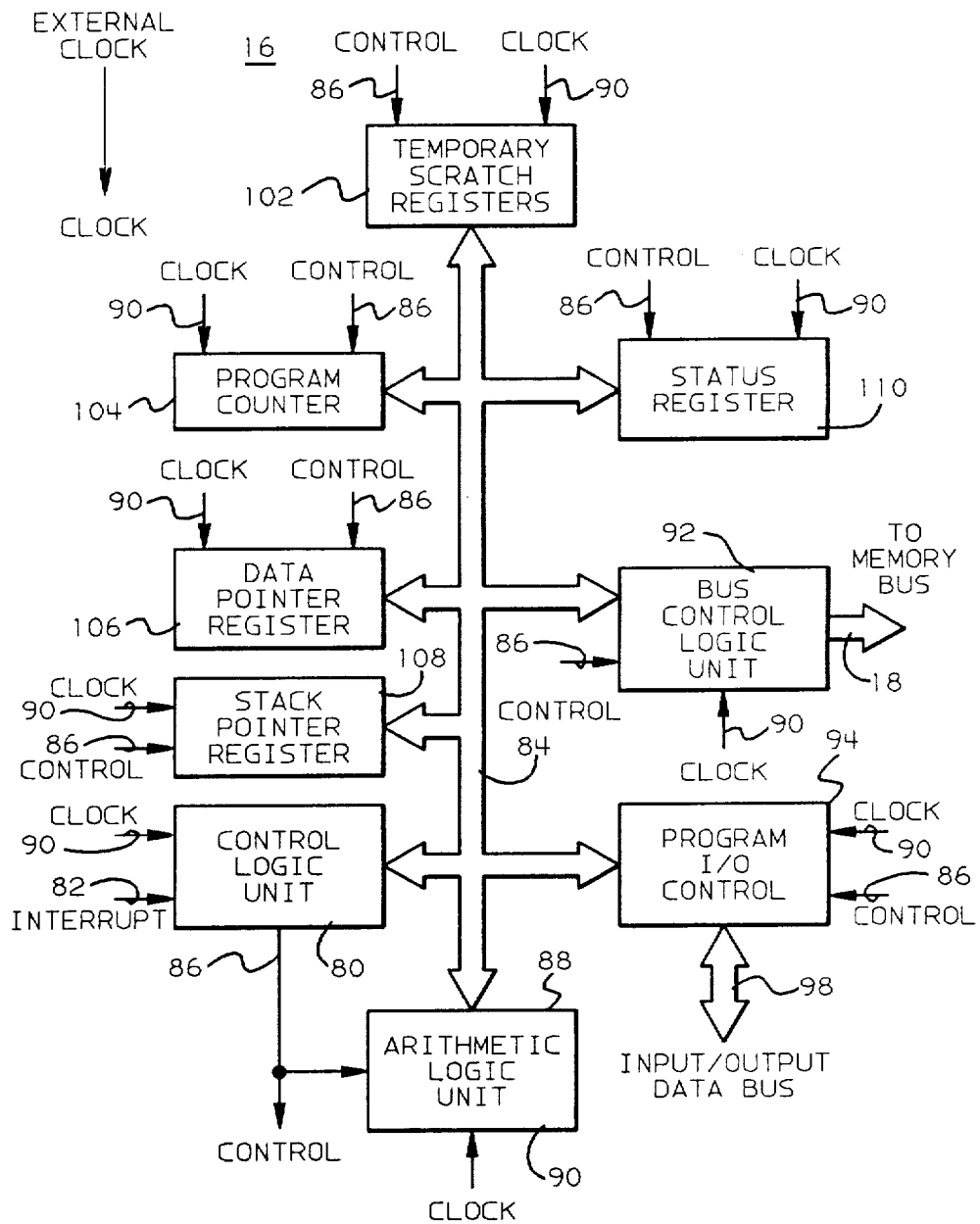
FIG. 2 is a block diagram further defining the processor shown in FIG. 1.

Referring to FIG. 2, the processor 16 is shown in further detail to illustrate typical hardware elements as found in such processors. The processor 16 can be almost any commercially available unit.

Such a processor includes a control unit 80 which responds to interrupts on a device bus 82 from the keyboard 12, the DASD 22, or the printer 24. The control unit 80 is also connected to an internal data and address bus 84 which is interconnected to various other units of the processor 16.

In response to a fetch instruction from the memory 26, the control unit 80 generates control signals to other units of the processor 16. These control signals are interconnected to the various units by means of a control line 86 which is illustrated directly connected to an arithmetic logic unit (ALU) 88. Synchronous operation of the control unit 80 with other units of the processor 16 is achieved by means of clock pulses input to the processor from an external clock source (not shown). The clock pulses are generated by the external clock source and transmitted through a bus 90 also shown interconnected to most of the other units of the processor detailed in FIG. 2.

Data and instructions to be processed in the processor 16 are input through a bus control unit 92. Data to be processed may also come from a program I/O control unit 94. The bus control unit 92 interconnects storage elements of the memory 26 and receives instructions for processing data received from the I/O control unit 94 or received from the memory 26. Thus, the I/O control unit 94 receives data from the keyboard 12 or the DASD 22 or the memory 26, while the bus control unit 92 receives instructions and/or data from the same memory. Note, however, that different storage sections of the memory 26 are identifiable for instruction storage and data storage.

Device control information from the processor 16 is output through the program I/O control unit 94 over an I/O data bus 98. Input data on the data bus 98 from the keyboard 12 or other device is processed internally through the processor 16 by instructions through the bus 84 to the control unit 80 by the ALU 88. The ALU 88, in response to a control signal on line 86 and in accordance with instructions received on the memory bus 18, performs arithmetic computations which may be stored in scratch registers 102.

Various other transfers of data between the ALU 88 and other units of the processor are, of course possible. Such additional transfers may be to a program counter 104, a data pointer register 106, a stack pointer register 108, or a status register 110.

The particular operation of the processor 16 is determined by instructions and data on the memory bus 18 and input data on the bi-directional bus 98. As an example, in response to received instructions, the processor 16 transfers data stored in the scratch register 102 to any one of the registers 106, 108, 110. Such operations of processor 16 as detailed in FIG. 2 are considered to be well known by one of ordinary skill in the data processing field. A detailed description of each operation of the processor 16 of FIG. 2 for the described invention is not deemed necessary for an understanding of the invention as claimed.

Pages stored in the storage media on the DASD 22 are partitioned into records, which are units of text of convenient size. Records have a maximum size. Pages thus consist of at least one and possibly more records. The number of records in a page and the number of pages in a document are indefinite, and are constrained only by the capacity of the storage volume to store the data set. A data set in the word processing system 10 is stored on a single diskette or the hard disk. If a document being entered into the system 10 is too large for a single diskette, the operator must terminate the entry operation for the current diskette or hard disk and must continue the document in a different data set on another diskette.

The storage media on the DASD 22 is partitioned into sectors in a manner well known in the data processing field. The concept of a sector is considered to be well known by one of ordinary skill in the data processing field. A detailed description of the concept of sectoring is not deemed necessary for an understanding of the invention as claimed. In the word processing system 10, each sector on the storage media is assigned a unique logical sector number, where logical sector numbers are consecutive nonnegative integers beginning with 0. The physical location on the storage media which corresponds to a particular logical sector number is not important to the understanding of the invention as claimed, as long as each logical sector number corresponds to one and only one physical area on the storage volume. Logical sectors are considered consecutive when their logical sector numbers are consecutive integers.

Figure 3:
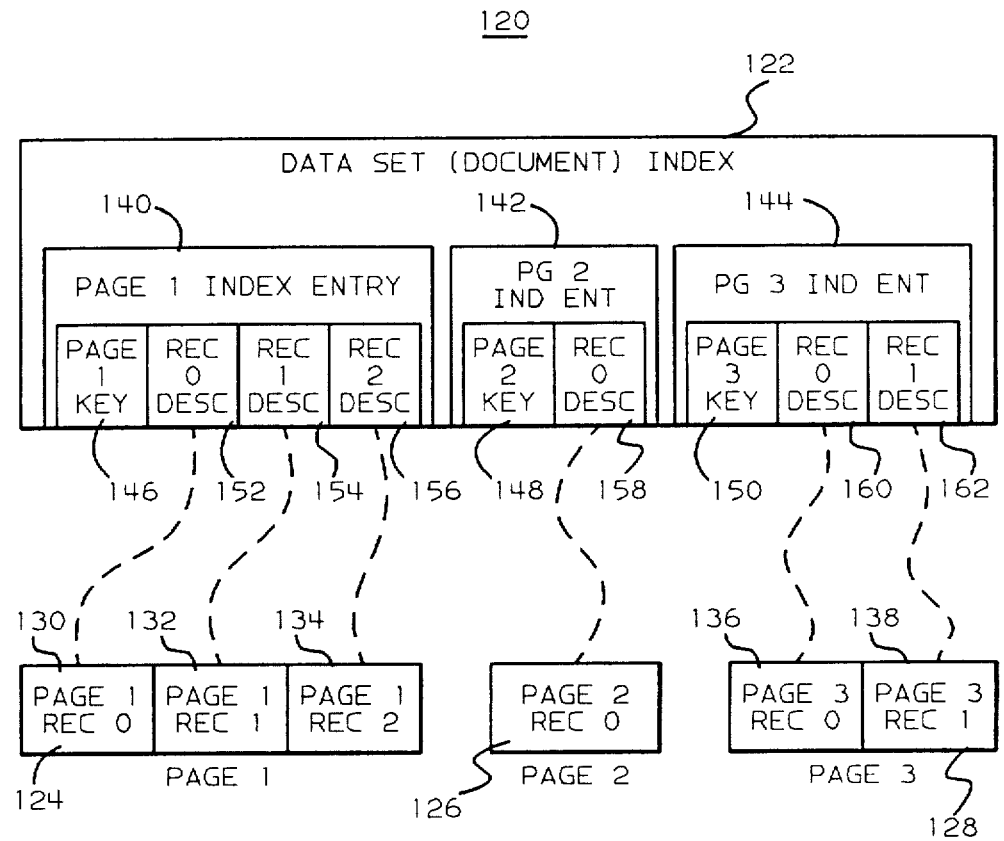
FIG. 3 shows the organization of text within a document on the storage device (diskette or hard disk). Each document or other large grouping of information on the storage device is known as a data set.

Referring to FIG. 3, an example of a text document is shown as it is organized into a data set 120 on the DASD 22. The data set 120 in this example consists of a data set index 122 and three text pages, a page 1 (124), a page 2 (126), and a page 3 (128). Page 1 (124) has three records, a record 0 (130), a record 1 (132), and a record 2 (134). Page 2 (126) is small enough to be contained in a single record 0 (126). Page 3 (128) requires two records 136 and 138.

A data set index 122 is the means whereby the SAM routines 44 determine where on the storage media the data set pages are located. The data set index 122 contains one index entry for each page of the document, page 1 index entry 140, page 2 index entry 142, and page 3 index entry 144.

In order to facilitate locating the desired page quickly, each page index entry contains key which identifies the page which is referenced by the entry. Thus, in this example, there exists a page 1 key 146, a page 2 key 148, and a page 3 key 150. To locate page 2 (126), for example, page 1 index entry 140 may be determined to be inappropriate simply by comparing the page 1 key 146 with the key of the desired page 2. In the word processing system 10, all page keys within a data set index must be unique.

The data for each record of a page is located through the index entry by means of a record descriptor. Each record is stored on the storage volume in a set of consecutive logical sectors. The number of logical sectors allocated to a record corresponds to the minimum number of sectors required to contain the record. Only whole sectors are allocated. The record descriptor contains the location on the storage media of the logical sector containing the record whose logical sector number is numerically lowest. The record descriptor also contains the length of the record. In FIG. 3, for example, the record descriptor for page 1 record 0 (130) is found in page 1 index entry 140 record 0 descriptor 152. The remainder of page 1 (124) is described in record 1 descriptor 154 and record 2 descriptor 156. The single record containing page 2 (126) can be located on the storage media by record 0 descriptor 158 in page 2 index entry 142. Page 3 index entry 144 similarly contains record 0 descriptor 160 and record 1 descriptor 162 pointing to page 3 record 0 (136) and page 3 record 1 (138), respectively.

The data set index 122 of a data set stored on the DASD 22 of system 10 is partitioned into index nodes. Each index node is stored in one logical sector. If additions of text to the data set cause the amount of information in one of the index nodes to grow beyond that which can be stored in one logical sector, the index node is partitioned into two or more index nodes, so that each resulting index node can be contained within one logical sector. Every data set has at least one index node.

Figure 4A:
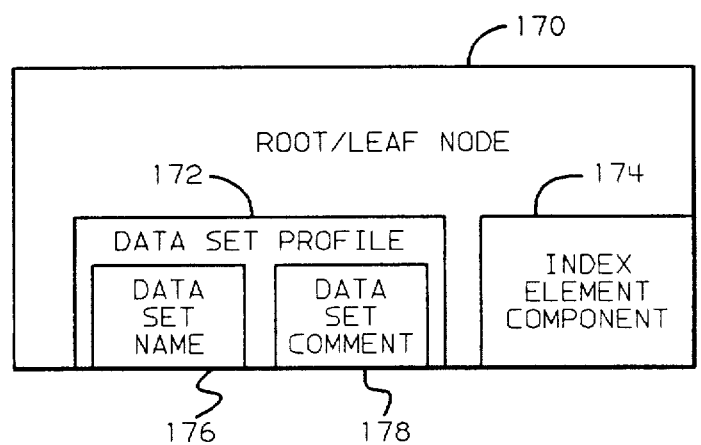
FIGS. 4A–B show an example of a data set index for a relatively small data set, where the data set index contains only a root/leaf index node.

For every data set there is a unique index node called the root node. Also, index nodes whose index entries refer directly to pages are called leaf nodes. FIG. 4A shows an example in which the data set index is small enough that the single leaf node needed and the root node are the same node, called the root/leaf node 170. Root/leaf node 170 contains a data set profile 172 and an index element component 174. The data set profile 172 contains information and status relating to the data set as a whole. A data set name 176 contains the text graphics by which the operator selects the document for access. A data set comment 178 provides more space for descriptive information about the document which the operator does not wish to have as part of the data set name 176.

Figure 4B:
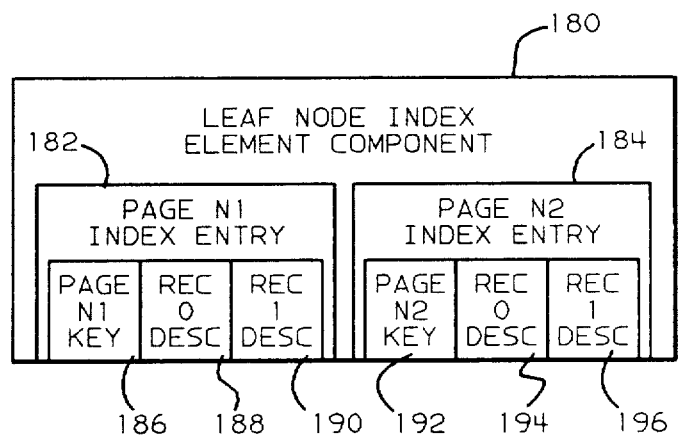

FIG. 4B is a diagram providing more detailed information about the index element component 174 of root/leaf node 170. A leaf node index element component 180 contains the index entries which point directly to pages of the document. Leaf node index element component 180 in this example contains among other index entries a page N1 index entry 182 and a page N2 index entry 184, where N1 and N2 represent the page numbers of a pair of consecutive pages in the document. Page N1 index entry 182 contains a page N1 key 186 and one record descriptor for each record in page N1 among which are a record 0 descriptor 188 and a record 1 descriptor 190. Similarly, page N2 index entry 184 contains a page N2 key 192, a record 0 descriptor 194 and a record 1 descriptor 196.

Within an index element component, index entries are stored in order of ascending page keys in such a way that if page N2 immediately follows page N1 in the document, page N2 index entry 184 will immediately follow page N1 index entry 182 if both page N1 and N2 are referenced within the same leaf node.

Figure 5A:
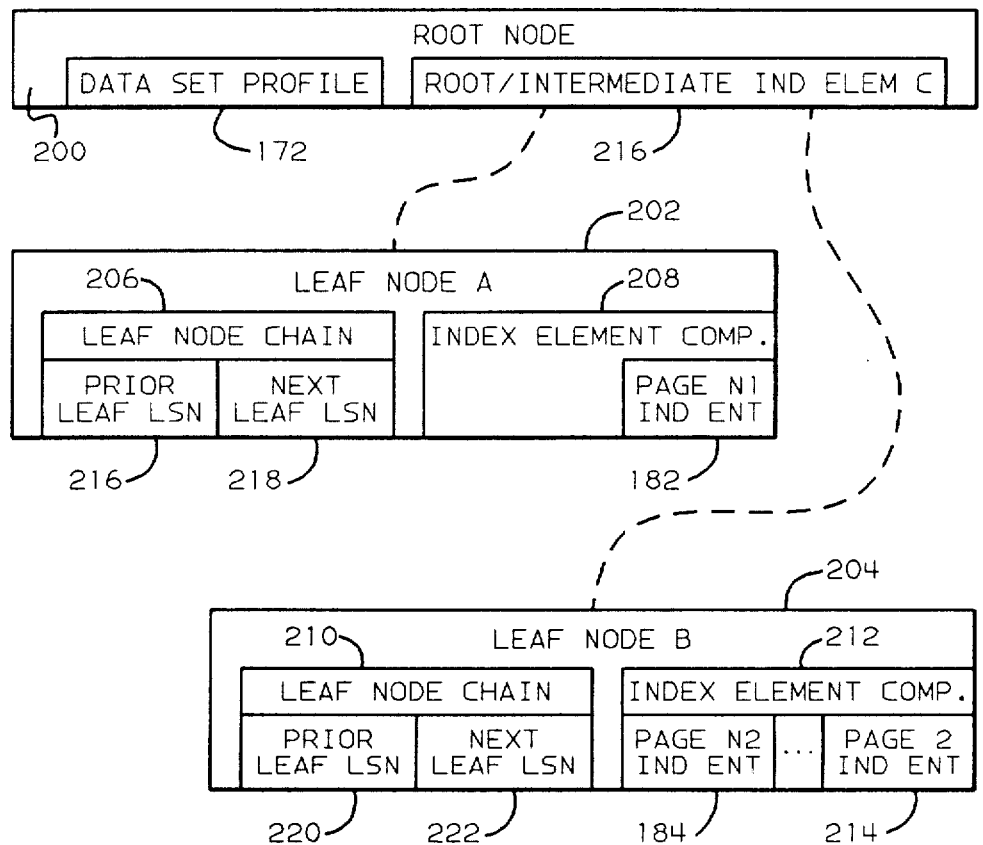
FIGS. 5A–B show an example of a data set index for a somewhat larger data set, where the data set contains a root node and two leaf nodes.

As the operator causes more text records and pages to be added to the document, root/leaf node 170 will eventually have insufficient room in index element component 174 for the next entry. FIG. 5A illustrates the result of partitioning root/leaf node 170 into a root node 200, a leaf node A (202), and a leaf node B (204). Root node 200 now contains a data set profile 172 the same as in root/leaf node 170 and a root/intermediate index element component 206. Leaf node A (202) has as major components a leaf node chain 206 and an index element component 208. Leaf node B (204) has as similar major components a leaf node chain 210 and an index element component 212.

The index element components 208 and 212 of leaf node A (202) and leaf node B (204) together contain the same information as was in the index element component 174 (as detailed in leaf node index element component 180 in FIG. 4B) of root/leaf node 170 in FIG. 4A. In the example of FIG. 5A, it is assumed that the index element component 180 has been split among index element components 208 and 212 such that the index entries for page N1 and all prior pages are stored in index element component 208 of leaf node A (202), and the index entries for page N2 through page 7 (the last page of the document) are stored in index element component 212 of leaf node B (204). This implies that the page N1 index entry 182 is the last index entry in index element component 208, and page N2 index entry 184 is the first index entry of index element component 212. Since page 7 denotes the last page of the document in this example, the page 7 index entry 214 is the last index entry of index element component 212.

Figure 5B:
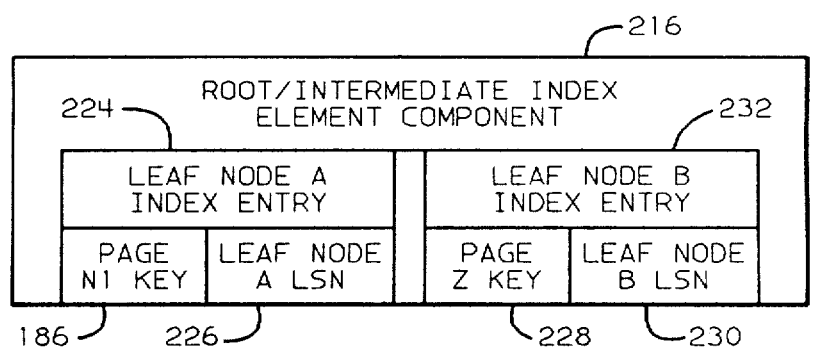

Note that the index structure illustrated in FIG. 5A-B allows quick selection of the proper leaf node for a particular desired page. While searching the index element component of the root node, comparing the key of the desired page with the keys of the index entries, the first index entry in the root node 200 containing a page key higher than the key of the desired page refers to the leaf node which must contain the index entry that locates the desired page if the desired page exists in the document.

To facilitate sequential viewing and revision of the document (commonly called scrolling through the document in the data processing field), leaf node chains are provided so that the next leaf node (or prior leaf node) may be located without reference to the root node of the document when the point of viewing or revision reaches records referenced at the end of the index element component for the appropriate leaf node. Leaf node chain 206 of leaf node A (202) contains two logical sector numbers (LSNs), a prior leaf LSN 216 and a next leaf LSN 218. In the example of FIG. 5A, there is no prior leaf for leaf node A (202), since leaf node A (202) contains the index entry for the first page of the document, so the prior leaf LSN 216 would be set to a value that may be recognized as an invalid logical sector number by the SAM routines 44. The next leaf LSN 220 in leaf node chain 210 of leaf node B (204) contains the logical sector number of leaf node A (202). Likewise, since leaf node B (204) contains the index entry for the last page of the document, the next leaf LSN 222 contains the invalid logical sector number value.

The root node 200 is the starting point of the index of the data set. Therefore, root/intermediate index element component 216 index entries allow leaf node A (202) and leaf node B (204) to be located on the storage volume. In leaf node A (202), page N1 index entry 182 references the last page referenced by leaf node A (202). This means that the page N1 key 186 (FIG. 4B) is the arithmetically greatest key in index element component 208. This is called the high key for the leaf node A (202). Similarly, the key in page 7 index entry 214 is arithmetically greater than the keys for all other index entries in index element component 212 of leaf B (204), so the page 7 key is the high key for leaf node B (204).

FIG. 5B is a diagram showing more detail for root-/intermediate index element component 216 of root node 200. Since there are two leaf nodes in FIG. 5A, there are two index entries in root/intermediate index element component 216. Leaf node A index entry 224 contains the page N1 key 186 and a leaf node A LSN 226 containing the logical sector number of leaf node A (202). Likewise, a page 7 key 228 and a leaf node B LSN 230, containing the logical sector number of leaf node B (204), are contained in a leaf node B index entry 232.

Note that unlike the record descriptors of FIG. 3, the leaf node index entries 224 and 232 do not contain values for record or index node lengths. Since index nodes are always a single logical sector, and since the root/intermediate index element component 216 always refers to index nodes (leaf nodes in FIG. 5A), the length of the referenced index nodes is always the same and can be omitted from the index entry.

Insertions of index entries for new pages or additions to existing index entries for new records always occur in a leaf node. As a consequence of this, it may happen that an existing leaf node contains insufficient space when adding a new record or page. The leaf node with insufficient space is then replaced with two leaf nodes, in a SAM operation called a split. The root node index element component contained a single index entry for the leaf node prior to the split (leaf node B index entry 232, for example). This index entry must be replaced by two index entries, one index entry for each of the two new leaf nodes. This operation is a simple extension of the operation of splitting a root node into a root and two leaf nodes, and the operation will not be illustrated with a separate diagram.

As the operator enters the graphic characters and commands for a very large document, enough new leaf nodes may be added so that there is not enough space in the root node index element component 216 for another leaf node index entry. At this time the root node 200 must be split again. Because the root node 200 is referring to leaf nodes, new leaf nodes cannot be created (leaf nodes do not refer to other leaf nodes outside the leaf node chains). Instead, another type of node is created called an intermediate node.

Figure 6:
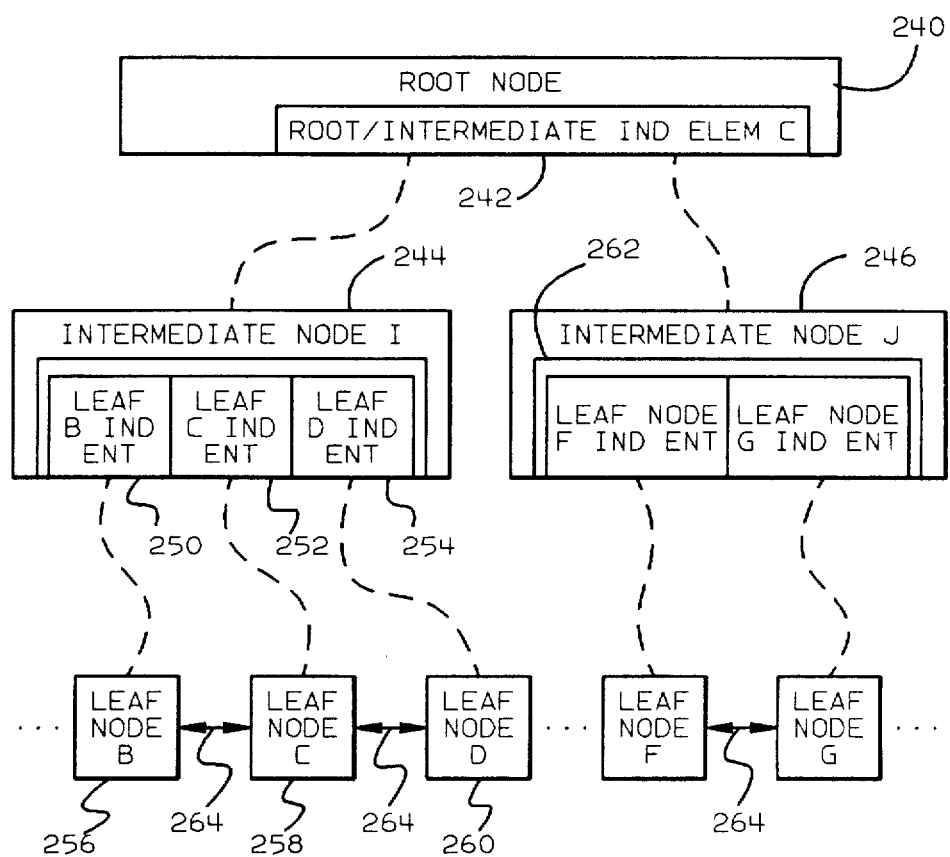
FIG. 6 is a block diagram of an example of a data set index which contains a root node, two intermediate nodes, and many leaf nodes.

Referring to FIG. 6, the root node 200 from FIG. 5A has been replaced with a root node 240 containing a root/intermediate index element component 242 which has the same structure as that shown by FIG. 5B. However, instead of containing leaf node logical sector numbers, the index entries in index element component 242 contain the logical sector numbers of intermediate node I (244) and intermediate node J (246). Within intermediate node I (244) there is an index element component 248 containing a leaf B index entry 250, a leaf C index entry 252, and a leaf D index entry 254 which refer to leaf node B (256), leaf node C (258), and leaf node D (260), respectively. The index entries in index element component 248 have exactly the same structure as leaf node A index entry 224 in FIG. 5B. The index element component 262 in intermediate node J (246) is structured in the same way as index element component 248.

The connections 264 between adjacent leaf nodes in FIG. 6 are a representation of the leaf node chain such as 206 and 210 in FIG. 5A.

FIG. 6 thus shows an example of a general index structure which allows the storage access method routines 44 to locate a desired page or record in two different ways, depending on the manner of viewing or revising the document. In order to locate the first record of a page referenced in leaf node D (260), the SAM routines 44 would fetch the root node 240 from the DASD 22 and would search the root index element component 242 to determine that intermediate node I (244) is the appropriate intermediate node. Intermediate node 244 would then be fetched from the storage media and the leaf node D (260) is similarly selected as the proper leaf node. After fetching leaf node D (260) from the storage media, the index element component of leaf node D (260) is searched to locate the key of the desired page.

On the other hand, if the operator is at the end of the last record referenced in leaf node C (258) and desires to scroll into the next record of text (which is referenced in leaf node D (260), the leaf node chain in leaf node C (258) can be used directly to locate leaf node D (260) on the storage media without requiring that the root node and an intermediate node be fetched and searched again.

Figure 7:
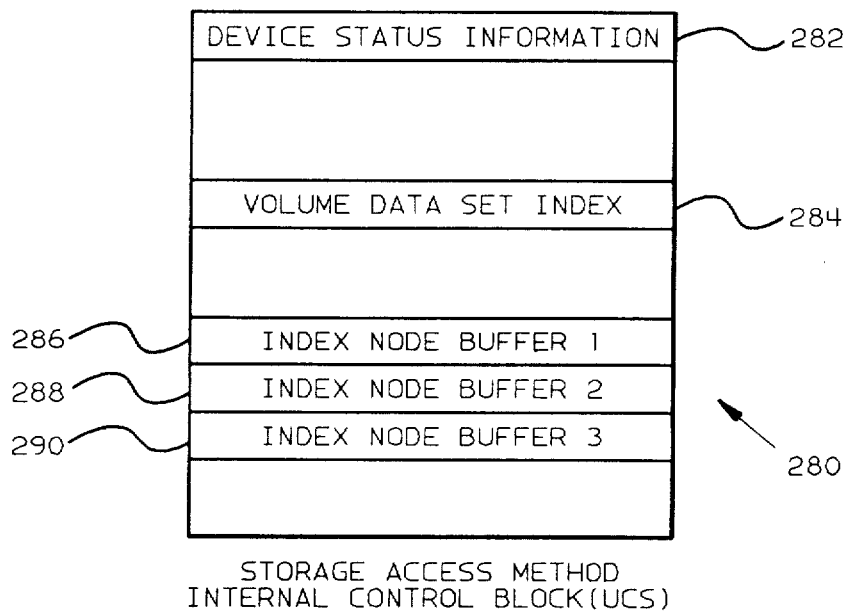
FIG. 7 is a diagram further defining the Storage Access Method (SAM) Internal Control Block shown in FIG. 1.

FIG. 7 provides more detail regarding the SAM internal control block (UCS) 62 shown in FIG. 1. UCS 280 contains device and operation status and control information and provides buffer areas for the access and updating of data set and volume indexes. The term volume refers to a DASD 22 such as a single diskette or a hard disk attached to the word processing system 10. Each volume available for processing by the system has its own UCS.

A device status information area 282 contains data and control indicators used by the SAM routines 44 to control the actual input/output operations to the DASD 22. Device status information 282 is also used by the SAM routines 44 to determine which of the available volumes should be accessed during the processing of a request from the keystroke service routines 34.

A volume data set index 284 contains the first level of volume index called an anchor. The volume index is an index to the available data sets in the same manner that a data set index is an index to the pages and records of a document. The anchor is retained in system memory 26 in order to eliminate an input operation from DASD 22 when a data set must be located on the volume. Locating a data set on the volume is very similar to locating a page within a data set, where the keys in the volume index consist of the type of data set (text document, for example) and the data set name (as illustrated by data set name 176 in FIG. 4A).

Index node buffer 1 (286), index node buffer 2 (288), and index node buffer 3 (290) are buffer areas in which data set index nodes or volume index nodes are processed between transfers to and from the DASD 22. Each index node buffer can contain one index node. More than one buffer is provided to facilitate index searches and split operations.

The rest of UCS 280 is used for internal status and control information and to contain the results of various intermediate calculations and operations, a detailed explanation of which is deemed not necessary for an understanding of the invention as claimed.

Figure 8:
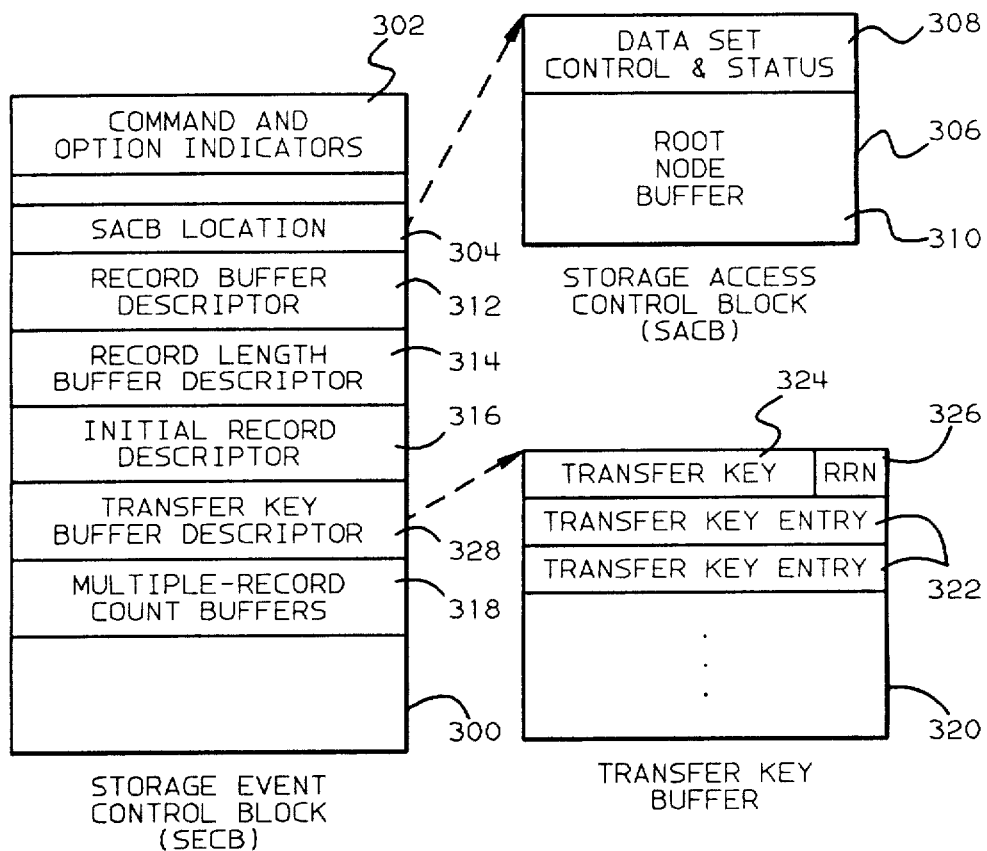
FIG. 8 is a diagram further defining the SAM Interface Control Blocks shown in FIG. 1.

FIG. 8 is a block diagram providing further details of the SAM interface control blocks 50 in FIG. 1. The major operations provided by the SAM routines 44 covered by the invention claimed are Open data set for access, Read one or more records from the DASD 22 into memory 26, and Write one or more records from memory 26 to DASD 22.

For each service requested of the SAM routines 44 by the keystroke service routines 34, a storage event control block (SECB) 300 is required. The area in memory 26 that is actually allocated to the SECB 300 is determined by the keystroke service routine 34 making the request. Channel 46 in FIG. 1 is used to pass the location of the SECB 300 to the SAM routines 44.

Within the SECB 300 can be found all the information necessary for the SAM routines 44 to initiate the particular operation requested. A command and option indicators area 302 provides the indication of major operation command requested (Read record, for example) and the command operations which may modify the request (for example, whether multiple records or a single record should be processed during this service request). Command and option indicators 302 is used to produce a SAM service routine to process the particular command.

An area 304 contains the location of storage access control block (SACB) 306. As with SECB 300, the area in memory 26 actually allocated to SACB 306 is chosen by the keystroke service routines 34. All commands involving access to a single data set (including Open, Read record, and Write record) requires a valid SACB 306. A data set control and status area 308 in SACB 306 contains status and control information on the data set to be accessed, as well as status information on the SACB 306 itself. A root node buffer 310 contains the root node for the data set on completion of a successful Open command to prepare the data set and the UCS 280 for access to the data set.

A record buffer descriptor 312 contains the location in memory 26 of the buffer to be used for data set records. An example of a record buffer is the text storage buffer 28 in FIG. 1. The record buffer descriptor 312 also contains the amount of memory 26 dedicated to the record buffer for the duration of the command processing (the length of the buffer). A record length buffer descriptor 314 provides similar information regarding the buffer in system memory 26 in which to communicate the lengths of the individual records processed by the SAM routines 44 when processing of multiple records has been requested.

An initial record descriptor 316 contains the information needed to locate the proper index entry and record descriptor in the proper leaf node of the data set to transfer the selected record or records. The record descriptor 316 contains the location of the page key to select the proper page and the relative record number of the record within the page. Referring briefly to FIG. 3, in order to access the third record 134 of page 1 (124), the key must be arithmetically equal to page 1 key 146 and the relative record number must be 2.

When a Read record or Write record command has been specified and an option indicator shows that multiple record processing has been requested, a multiple-record count buffers area 318 specifies the number of records. One buffer contains a maximum number of records that the SAM routine 44 is to process without errors before terminating the operation. The other buffer is used by the SAM routine 44 to inform the keystroke service routine 34 of how many records were actually processed before the command operation was terminated.

When transferring multiple records between the record buffer and the DASD 22, it is possible that records from more than one page may be transferred. Since the number of records in a page depends on the current state of the particular page, a means of indicating which records belong to which page is required. The actual method of specifying this information is via a transfer key buffer 320. The transfer key buffer 320 contains one transfer key entry 322 for each record in the record buffer which is the first record of a page. The transfer key entry 322 contains a transfer key 324 which is the page key for the page of the record, and a relative record number (RRN) 326 which identifies the relative record in the record buffer to which the transfer key is relevant. Within a document stored on the DASD 22, the relative record number of the first record of any page is 0. The transfer key entry RRN 326, however, identifies the relative record within the record buffer in memory 26. Transfer key entries 322 appear in the transfer key buffer 320 in ascending numeric order of transfer key entry RRN 326. Furthermore, since a record can only belong to one page in the document, transfer key entry RRNS 326 in the transfer key buffer 320 must be unique for the duration of processing a single command request. Thus, at most one transfer key entry RRN 326 can have the value of 0, and if one transfer key entry 322 has a RRN value of 0 it must be the first entry in transfer key buffer 320. The location and length of the transfer key buffer 320 is found in a transfer key buffer descriptor 328 in SECB 300.

Figure 9A:
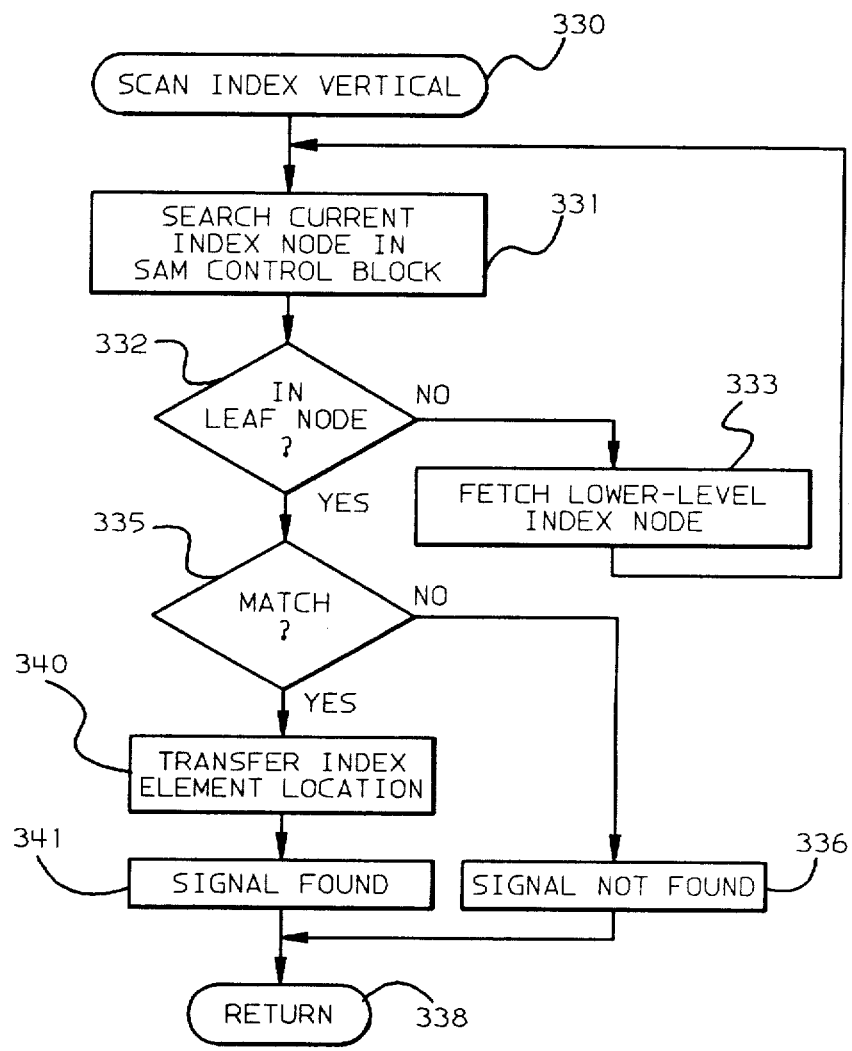
FIGS. 9A–B is a flow diagram showing the operational steps of the present invention with respect to Open data set for access.
Figure 9B:
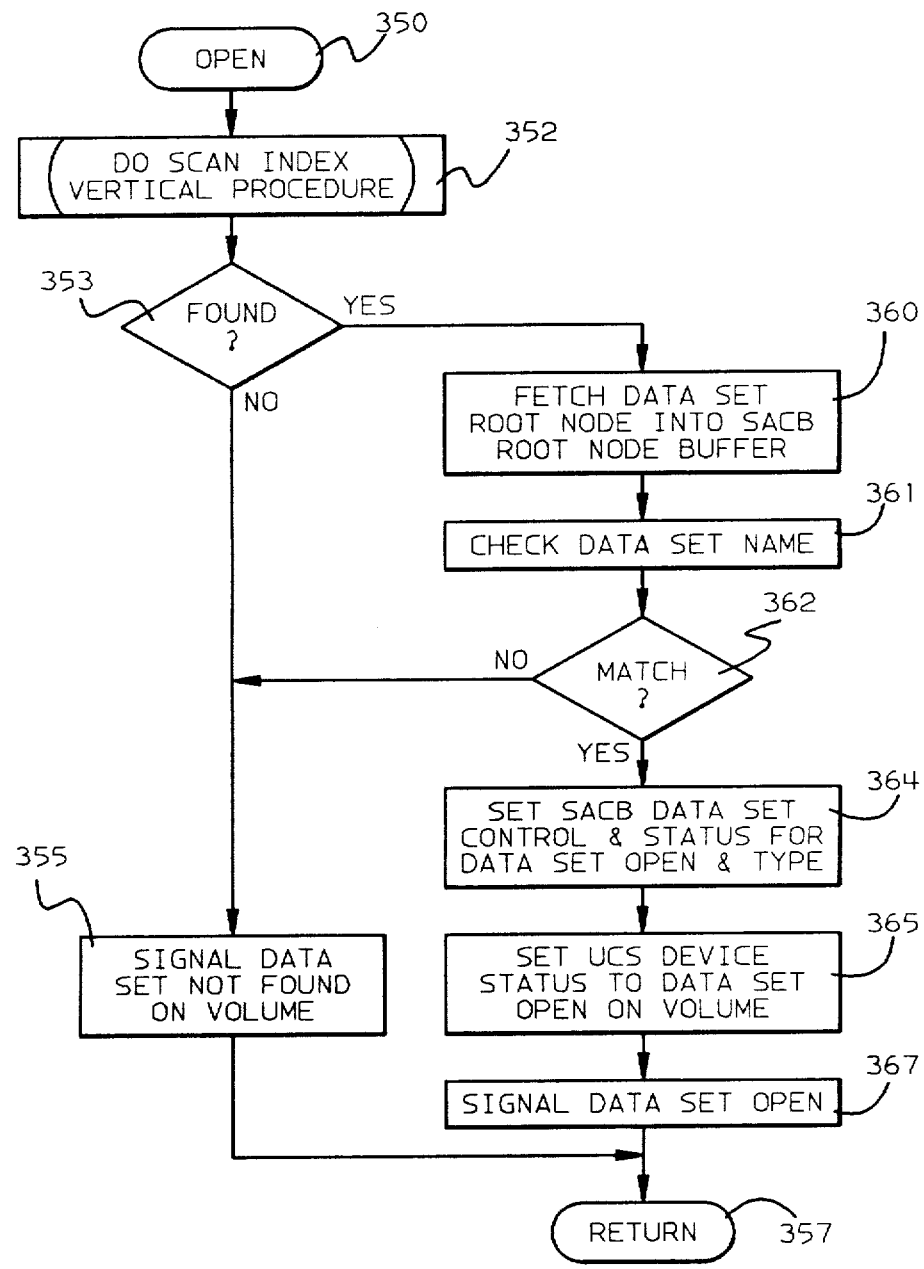

A logical operation of the present invention with respect to Open data set for access is illustrated in the flow diagrams shown in FIGS. 9A and 9B. FIG. 9A illustrates the scan index vertical operation, which scans from the highest level of the index (root node) to the lowest level (leaf node) searching index entries for a specified key value. The procedure is started with the scan index vertical service routine step 330. In step 331 the index entries in the index element control block of the current node in one of the SAM control blocks 50 or 62 are searched. For OPEN the first index node is the anchor node in the volume data set index buffer 284 of UCS 280. When the appropriate index element has been located in the current index node, the index node type is tested in step 332 to see if the index node is a leaf node (a root/leaf is considered a leaf node). If the current node is not a leaf node, there is another level of index to be searched. Step 333 fetches the lower-level node using the LSN in the index entry selected in the current node, and step 331 is then repeated.

If the current index node is leaf node, step 335 tests for an exact match of keys. If the input key is not matched exactly by the key in the selected index entry, an indication of key not found is returned via a return code in step 336 and the procedure completes in step 338 until the next vertical scan is required. The return code means is a concept that is considered well known to one of ordinary skill in the data processing field, and understanding the exact mechanism is not deemed necessary to the understanding of the invention.

If the desired page key is matched exactly, the location of the index element is transferred to a data area in the SAM internal control block 62 for use by other procedures in step 340. An indication of key found is returned in step 341 and the procedure terminates in step 338.

FIG. 9B illustrates a flow diagram of a logical operation of the present invention with respect to the SAM command of Open data set for access. The procedure is started with the Open routine in step 350. The scan index vertical procedure is performed in step 352. The desired key for this procedure is the data set name and type of the data set to be opened for access. The first index node in SAM control blocks is designated as the anchor node in the volume data set index buffer 284. The return code of the procedure is tested in step 353 to see if the data set was located on the volume. If not found, step 355 will set up a return code to signal data set not found on volume and the procedure will terminate in step 357 until the next request to the SAM routines 44 to open a data set for access.

If the vertical scan of the volume data set index has located a candidate data set root node, the root node is fetched into the root buffer 310 of SACB 306 in step 360. Step 361 completes the data set match verification by checking the actual data set name 176 in the root node 170 (see FIG. 4A). If step 362 determines that the data set is not the desired data set, steps 355 and 357 terminate the procedure with an indication of not found as before.

Provided that the data set located is the one desired, the data set control and status 308 of the SACB 306 is set in step 364 to indicate data set type and valid open data set. The device status information 282 in UCS 280 is made to show an open data set, reserving the physical DASD 22 for the particular diskette or hard file now inserted in the system 10. The final step 367 before procedure termination sets up a return code to indicate to the keystroke service requesting the open that it was successful and the data set is available for further access.

One interface rule for the SAM routines 44 is that once a data set has been opened for access SACB 306 with the root node must remain available to the SAM routines as long as the data set remains open for access, until such time as a Close data set for access command is requested. The SACB 306 must also not be moved from its initial location in memory 26 to a different location in memory 26. This means that a copy of the root node 170 is available in memory 26 for the data set access operations of the SAM routines 44. In any access of a data set, the root node is the first index node which must be searched to locate a particular desired record. Therefore, having the root node available in root node buffer 310 in the SACB 306 means that at least one sector fetch operation from the DASD 22 is eliminated, thus improving performance of data set access operations. If the data set is small enough that the index can be contained entirely in a root/leaf node, no input operations from the DASD 22 are required to locate the record on the volume.

Figure 10A:
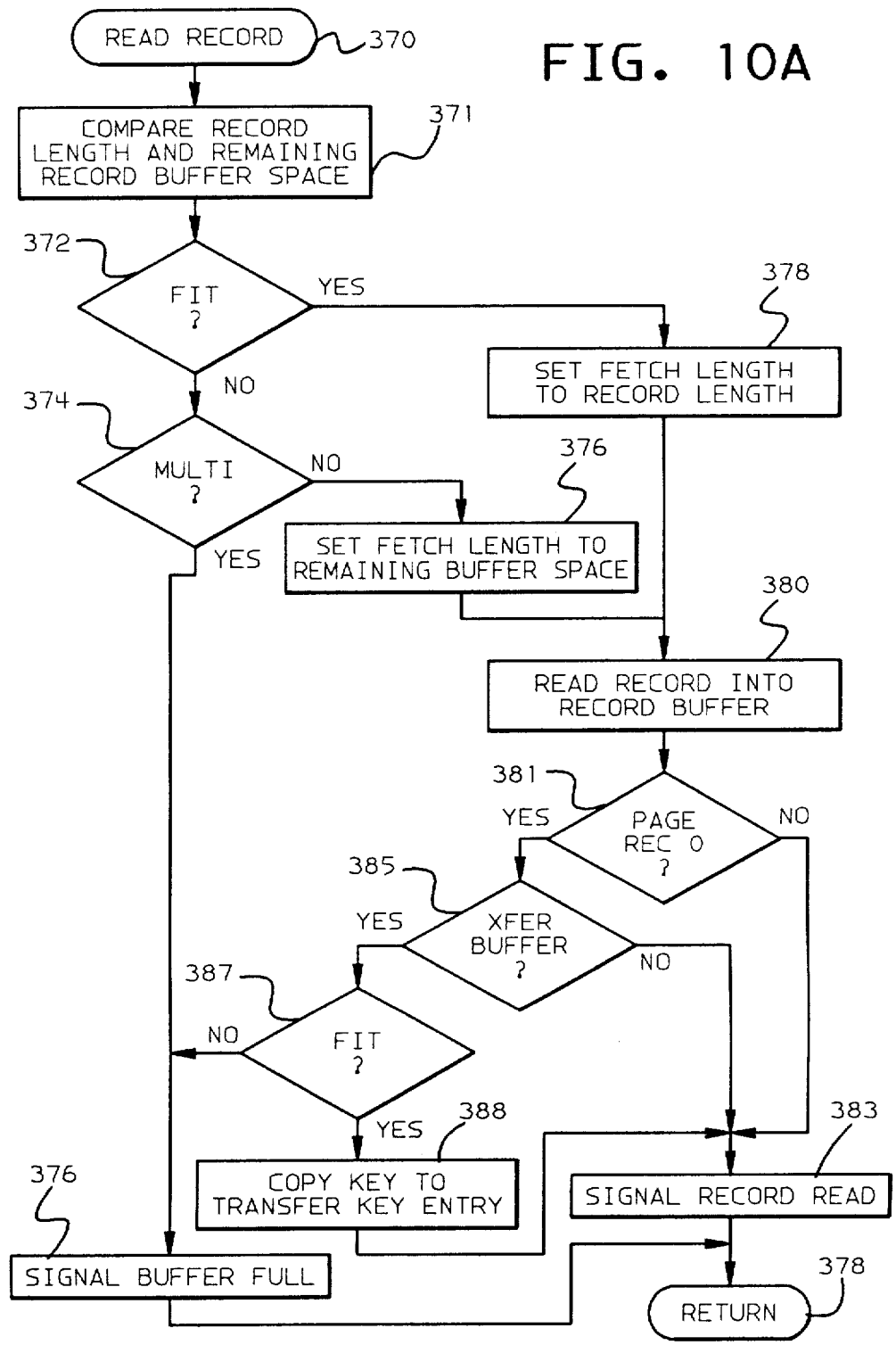
FIGS. 10A–C are flow diagrams showing the operational steps of the present invention with respect to Read (Fetch Records From Storage).
Figure 10B:
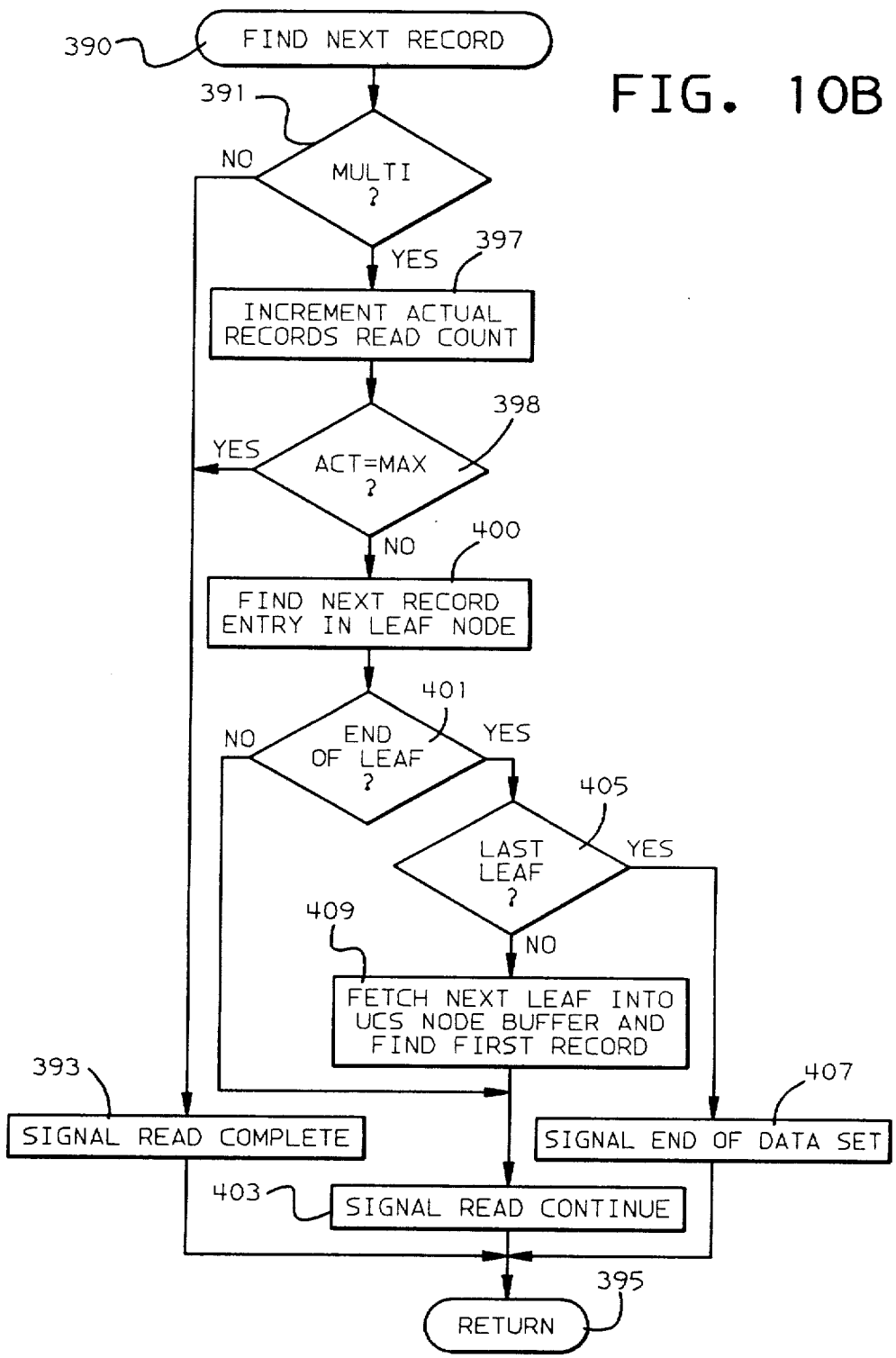

A logical operation of the present invention with respect to the Read records command is illustrated in the flow diagrams shown in FIGS. 10A, 10B, and 20C.

The Read Record service procedure is shown in FIG. 10A. The procedure is started with the read record service routine step 370. Another procedure is assumed to have located the record to be read, and to have communicated to this procedure the location of the record index entry. In step 371 the length of the record to be fetched is compared with the amount of space remaining in the record buffer according to the record buffer descriptor 312 in SECB 300. If the tests in steps 372 and 374 show that the record will not fit in the remaining space, a buffer full condition is signalled by a return code in step 376 and operations in the procedure are terminated in step 378 until the next read record request. The reason for tests 372 and 374 is that the SAM routines 44 will not allow the writing of a partial record, so the Read records function must transfer only whole records to the records buffer when multiple records processing has been requested as an option of the Read records command.

If the test in step 374 shows that multiple records processing has not been requested, the length of the data to be fetched from the record is set in step 376 to be equal to the length of the remaining space in the record buffer. On the other hand, if the test in step 372 shows that there is sufficient remaining space in the record buffer to contain the entire record, the length of the data to be fetched from the record is set equal to the length of the entire record.

In step 380, the record is fetched from the DASD 22 into the record buffer. At this time, the internal indicators of the amount of remaining space in the record buffer are decremented by the length of the data fetched from the storage volume.

The record index entry is checked in step 381 to see if the record is the first record of a page. If the record from which data was fetched is not the first record of a page, no further processing is needed in this procedure. A successful record read is signalled as a return code in step 383, and processing is terminated in step 378 as above. If the record is found to be the first record of a page in step 381 but the transfer key buffer descriptor 328 in SECB 300 shows in step 385 that no transfer key buffer was provided by the keystroke service routines 34, processing is likewise terminated for the procedure in steps 383 and 378 as above.

If a transfer key buffer was provided and a transfer key should be stored, the remaining space is checked against the transfer key entry length to see if there is enough remaining space in the buffer in step 387. If not, in steps 376 and 378 the processing in the procedure is terminated as described earlier in the discussion of step 374.

If there is room for the required transfer key entry in the transfer key buffer, the entry is copied to the buffer in step 388. The procedure is then terminated via steps 383 and 378 as illustrated earlier.

Another service routine procedure used in the read records command service is the Find Next Record procedure illustrated in FIG. 10B. The procedure is started with the find next record service routine step 390. If the multiple records option is found not to have been requested in step 391, a read completion is signalled by return code in step 393 and the procedure is terminated in step 395 until the next request to find the next record.

If multiple records processing was requested, the count of actual records processed is incremented in step 397. If the comparison in step 398 shows that the maximum number of records has already been transferred, the procedure is terminated in steps 393 and 395 as before. Otherwise, an attempt is made to find the next record index entry in the current leaf node in step 400. If there is a subsequent record index entry as determined in step 401, read continue is signalled via return code in step 403 and the procedure is terminated as before in step 395.

If there are no more entries in the current leaf node, the next leaf LSN 218 of leaf node chain 206 in FIG. 5A is tested in step 405 to determine if the current leaf contains the index entry of the last record of the data se2t. If the next leaf LSN 218 contains an invalid value for LSN on the current storage volume, end of data set (known as end of file in the data processing field) is signalled in step 409 and the procedure is terminated in step 395.

Finally, if there are no more index entries in the current leaf but there is a next leaf node, the next leaf node is fetched into one of the index node buffers in UCS 280, read continue is signalled in step 403, and the procedure is terminated in step 395.

Figure 10C:
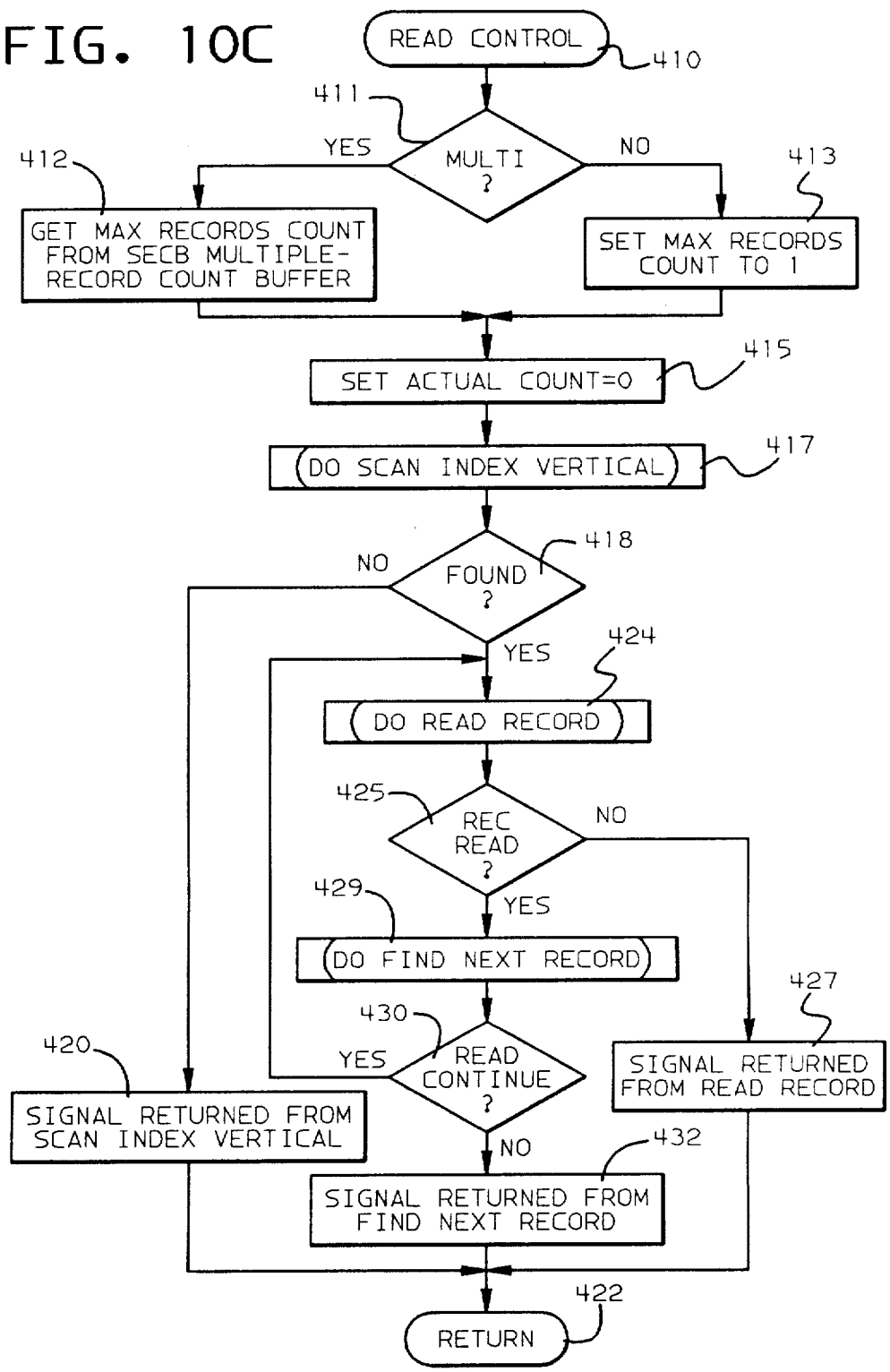

The read control procedure illustrated as a flow diagram in FIG. 10C serves to control the processing of a Read records command. First an internal maximum records count is set either in step 412 from the multiple record count buffer 318 in SECB 300 or as a constant 1 in step 413, depending on the result of the test in step 411 for multiple records processing option requested. Next the count of actual records processed is initialized to 0 in step 415 and the location of the first record index entry to be processed is located by doing a scan index vertical in step 417. If the result shows in step 418 that the request record could not be found, the signal returned from scan index vertical is passed on as a return code in step 420 and the procedure is terminated in step 422 until the next request from a keystroke service routine 34 is received by the SAM routines 44.

If the initial record was located, as determined in step 418, the read record procedure is performed in step 424. The results are then checked in step 425. If the record was not read properly, the signal returned from the read record procedure is passed on in step 427 and the procedure is terminated in step 422 as before.

If the record was read properly, the find next record procedure is performed in step 429. If it is found in step 430 that the next record should be read (read continue signal), the next record is read in step 424 as before. Otherwise, the signal returned from the find next record procedure is passed on as a return code and the procedure is terminated in step 422 as before.

FIGS. 10A–C thus illustrate how normal read record service procedures can be expanded to improve performance for the reading of sequential records from a data set. The index nodes are accessed only when all the designated records in the current leaf node have been processed, and then the only access is directly to the next leaf node. As an example of the performance improvement possible, if a two-level data set index is assumed (root node and leaf nodes), one input operation from the DASD 22 may be eliminated for every record read when selecting the multiple-records processing option. For the case of a single-level data set (only root/leaf node), assuming the Open data set for access procedures illustrated by FIGS. 9A and 9B, the performance of single-record reads as compared with multiple-record processing is the same (when using input/output operations as the measurement of performance). On a three-level data set, however, where there are leaf nodes, intermediate nodes, and a root node (as shown in the example of FIG. 6), up to two input/output operations may be eliminated for each record read. An example of a three-level data set could be a data set containing display character images for allowing the display of a Japanese Kanji character set of several thousand different characters. In this example, performance of read operations directly influence the performance of system 10, since the character font records are required to display the text entered by the operator via keyboard 12 into text storage buffer 28 on the display 20.

As the above examples illustrate, the procedures illustrated in FIGS. 9A-9C achieve no performance gains for very small data sets, where performance of sequential operations such as duplicate data set tend to be less of a performance problem, but achieve significant performance gains for large data sets where the performance improvements are needed most. The cost of the gain is greatly expanded interface buffer space requirements in memory 26. In the word processing system 10, however, in situations where multiple-record processing may improve performance, the available space in memory 26 will normally support the additional buffer requirements easily.

Corresponding to the SAM routines 44 procedures illustrated by the flow diagrams in FIGS. 10A-10C for read in sequential records, a logical operation of the present invention with respect to the Write records command processing is illustrated in the flow diagrams shown in FIGS. 11A-11E. FIGS. 11A-11E illustrate the example of insertion of new records into a data set.

Figure 11A:
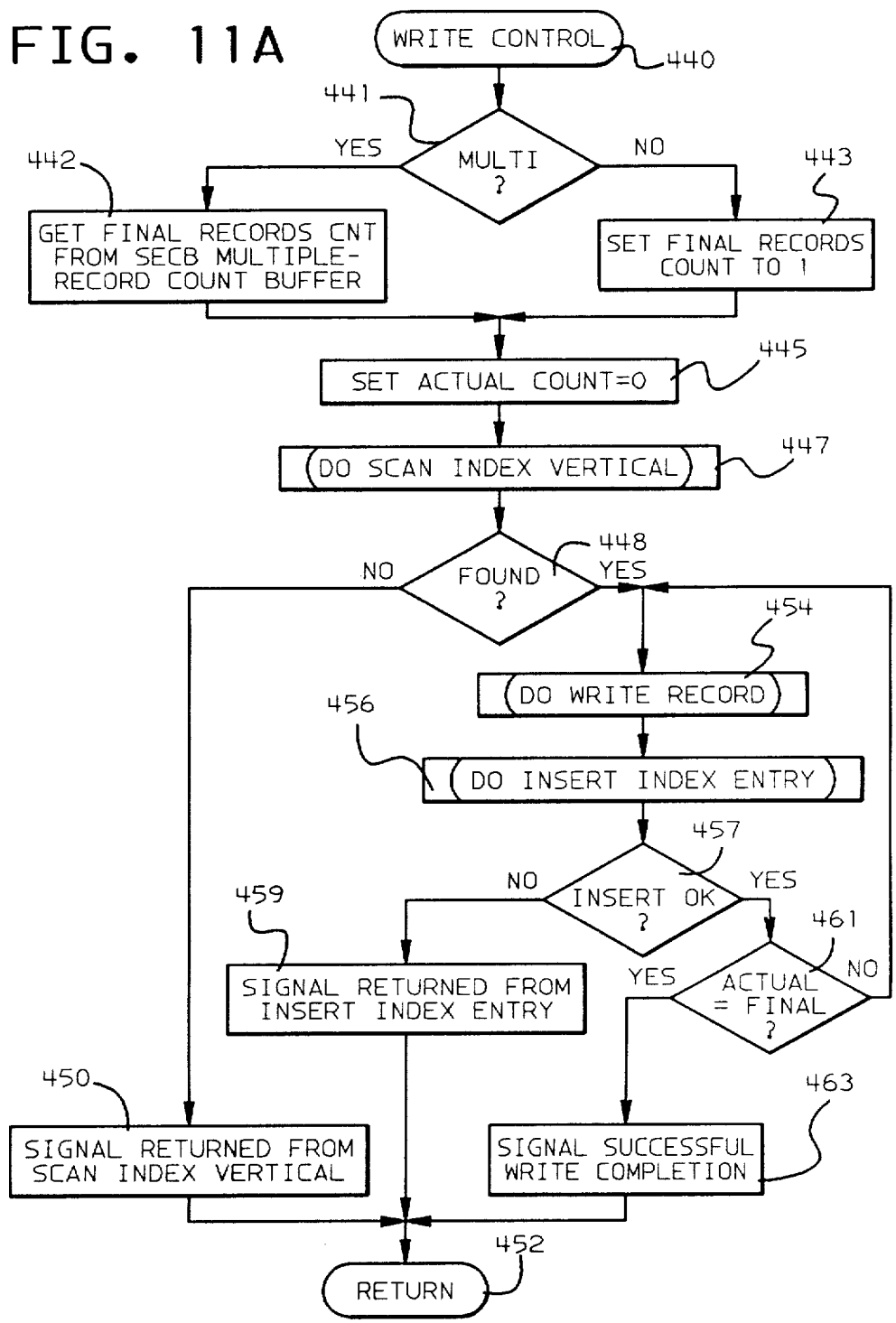
FIGS. 11A–E is a flow diagram showing the operational steps of the present invention with respect to Write (Store Records Onto Storage).

The flow diagram shown in FIG. 11A illustrates the flow of the overall Write Control procedure. The procedure is started with the write control service routine step 440. First an internal maximum records count is set either in step 442 from the multiple record count buffer 318 in SECB 300 or as a constant 1 in step 443, depending on the result of the test in step 441 for multiple records processing option requested. Next the count of actual records processed is initialized to 0 in step 445 and the location of the index entry at which point the first index element will be changed or inserted is located by doing a scan index vertical (FIG. 9A) in step 447. If the result shows in step 448 that the requested record insertion point could not be found, the signal returned from scan index vertical is passed on as a return code in step 450 and the procedure is terminated in step 452 until the next request from a keystroke service routine 34 is received by the SAM routines 44.

If the initial insertion spot was located properly, the record in the record buffer is written onto the storage volume in step 454. In step 456, an attempt is made to insert the index entry update constructed by the write record procedure into the index. If an insertion error is detected in step 457, the failure signalled by the insert index entry procedure is passed on in step 459 and the procedure is terminated in step 452 as above.

If the index entry insertion was successful, the actual count and maximum count of records are compared. If all designated records have been written, successful completion is signalled via return code in step 463 and the process is terminated as above in step 452. If there are more records to be stored on the volume, the next record is written in step 454 as above.

Figure 11B:
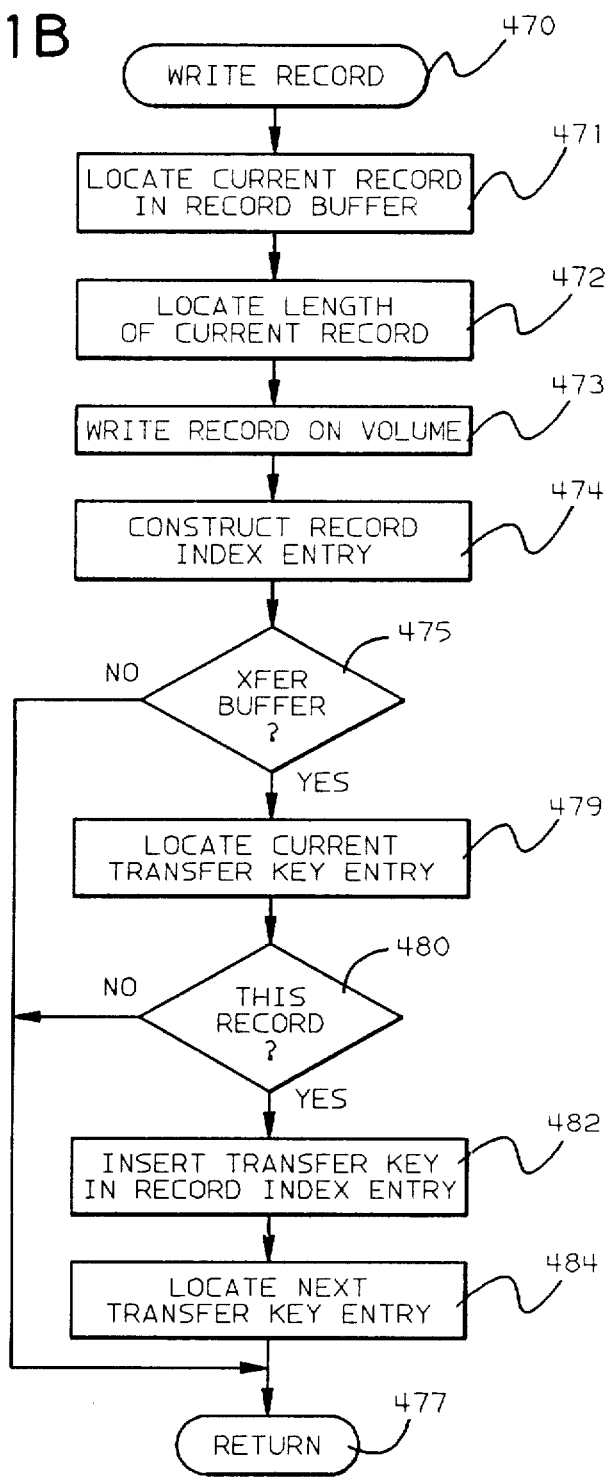

FIG. 11B shows a flow diagram illustrating the operations of the Write Record procedure. The procedure is started with the write record service routine step 470.

The current record to be written is located in the record buffer in step 471 and the length of the current record is obtained in step 472. Getting the record length if multiple-records processing has been requested involves using the number of records already processed to generate an offset within the record length buffer. The record is then written onto the storage volume in step 473. Thereafter the record index entry is constructed in step 474 for later insertion into a leaf node.

The transfer key buffer descriptor 328 in SECB 300 is tested in step 475 to determine if there is a valid transfer key buffer. If there is not, the procedure is terminated in step 477 until the next request to write a record onto the volume. Otherwise, the current transfer key entry is located in step 479.

In step 480 the transfer key RRN 326 in transfer key buffer 320 is compared with the number of records already processed to determine if the transfer key element refers to the current record just written. If not, the procedure is terminated in step 477 as above. Otherwise, a copy of the transfer key 324 in transfer key buffer 320 is inserted into the index entry constructed in step 474. Finally, the next transfer key is located in step 484 in preparation for the next record to be written, before terminating the procedure in step 477 as above.

Figure 11C:
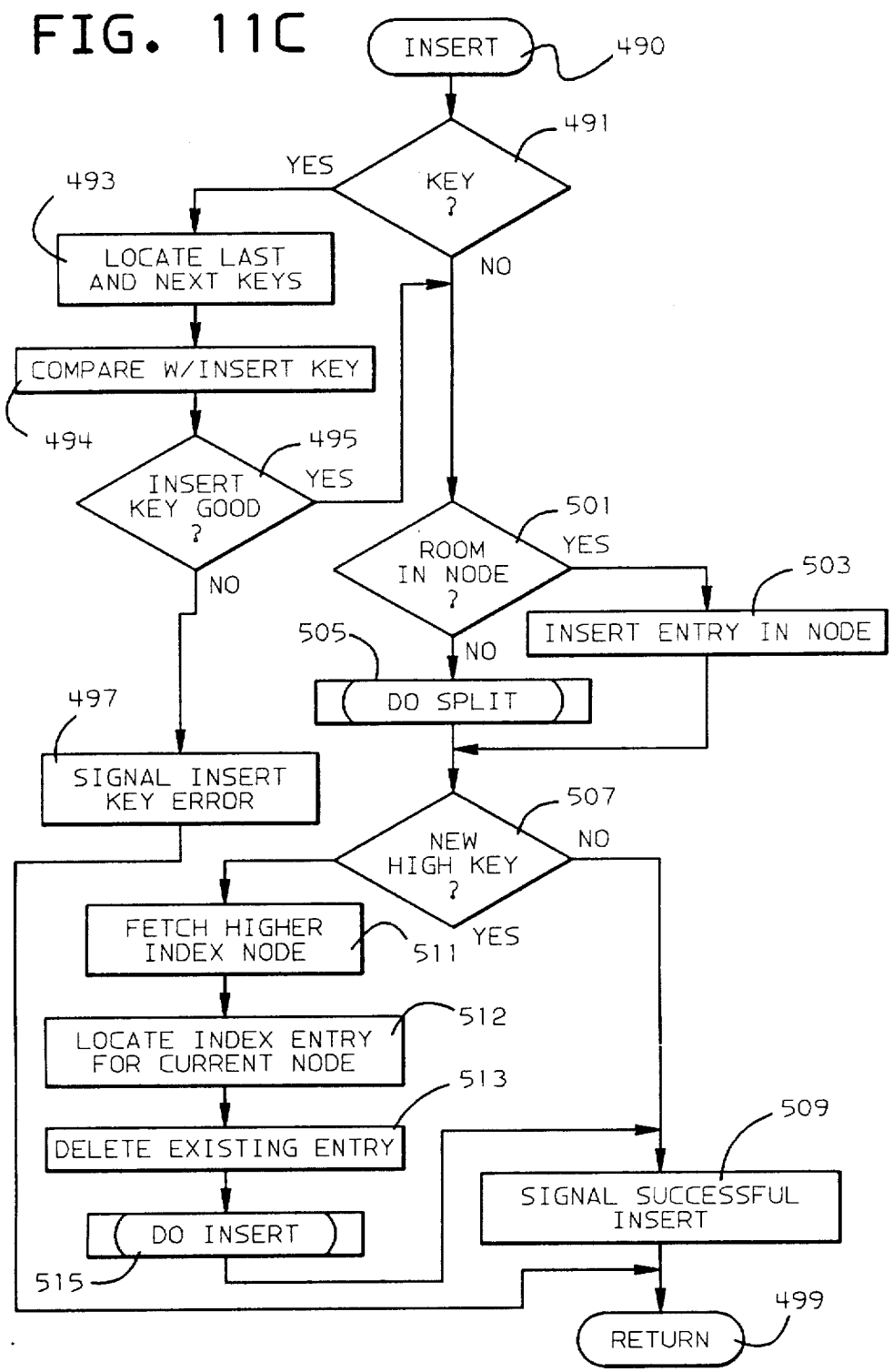

FIG. 11C shows a flow diagram that illustrates the operations of the Insert service routine procedure. The procedure is started in the insert service routine step 490. First, the insert entry is checked in step 491 for the presence of a key. If there is a key in the entry, the keys prior to and following the insert point are fetched in step 493 and these keys are compared with the insert entry key in step 494 to ensure that the prior key is strictly less than the insert key and the following key is strictly greater than the insert key. This ensures that the keys of the data set are unique and ordered properly within index nodes. Note that the comparison is only required for insertion into a leaf node, since keys in nodes at higher levels (intermediate nodes or the root node) are derived from the high key in leaf nodes. If the key is determined in step 495 not to be valid for the current insert position in the leaf node, insert key error is signalled in step 497 via return code and the procedure is terminated in step 499 until the next request for an insert is received.

If the key to be inserted is valid or if there is no key in the index entry, the remaining space in the index node is checked in step 501. If there is enough space to contain the insert entry it is inserted in step 503; otherwise, the split procedure is performed at step 505 to divide the current node to make room for the insert. The split procedure also performs the insertion as a part of the processing of the split operation.

In step 507, the insert point is checked to see if a new high key was inserted into the node. If not, a successful insert is signalled via return code in step 509 and the procedure is terminated in step 499 as above. If the node high key was changed by the insert, the higher-level node which contains the index entry directly referring to the current node is fetched in step 511, and the node is searched in step 512 to locate that index entry. The index entry is deleted in step 513.

In order to perform the insert in the higher-level node, the insert procedure makes a request to itself. This type of procedure is known as recursive procedure. Since the high key of the root node does not affect higher-level volume indexes, the procedure calls will eventually be completed, after a split of the root node if not at an earlier point. After r2ecursive insert request has terminated, the current request is terminated in step 499 as above.

Figure 11D:
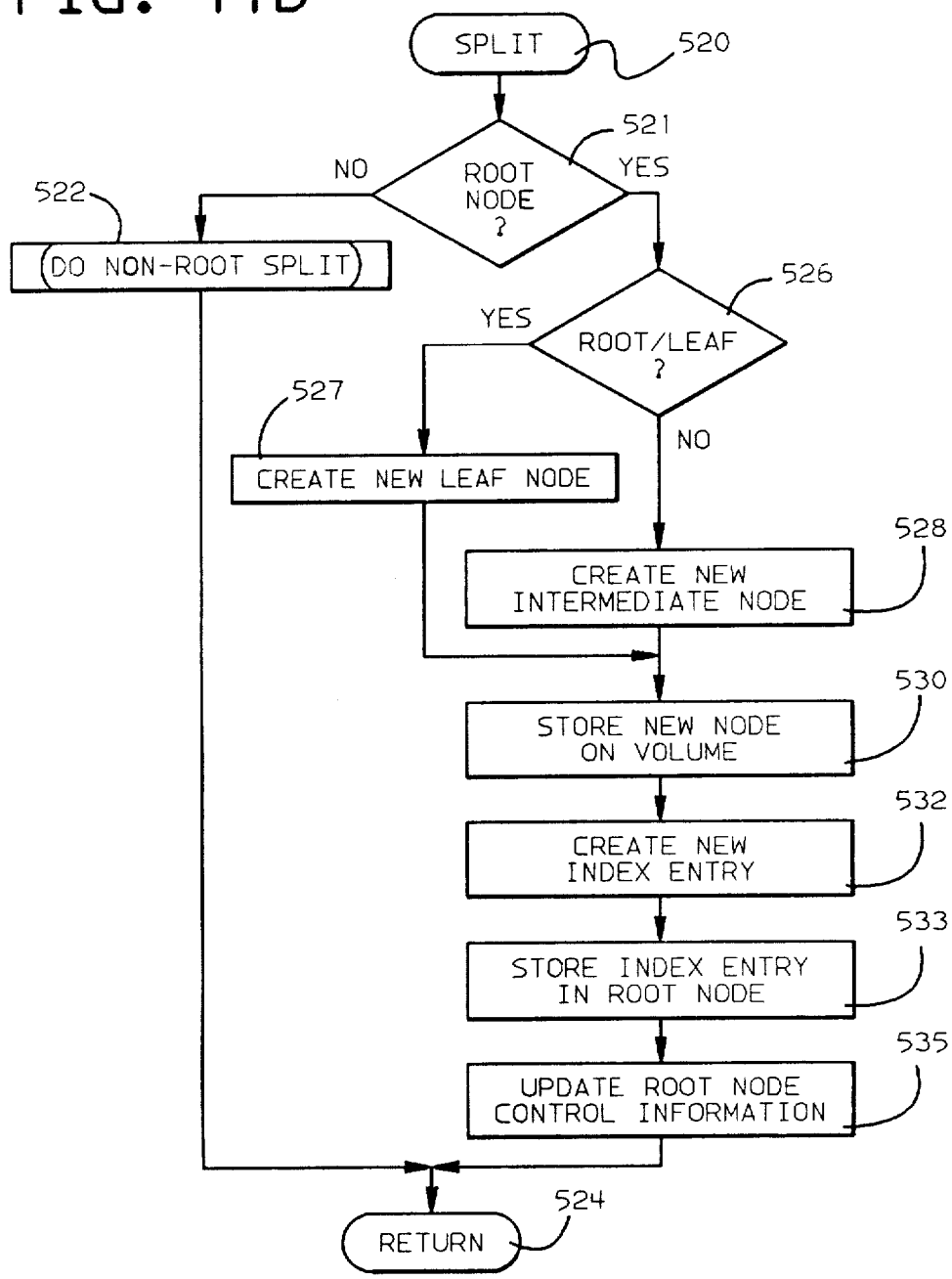

One more service routine procedure used in the write records command service is the Split procedure illustrated in a flow diagram shown in FIG. 11D. The procedure is started with the split service routine step 520. The type of node designated for split is tested in step 521 to see if the root node is being split. If not, the non-root split procedure is performed in step 522 and the split procedure is terminated in step 524 until the next split request is received.

If the root node is being split, it is checked in step 526 to see if it is a root/leaf. Depending on the results of the test, either a new leaf node or a new intermediate node is created. The new node contains all of the index elements of the current root. The insert is processed as a part of creating the new node. The reason for a single new node is that the data set profile resides only in root nodes. Transferring the index elements to an intermediate or leaf node will create sufficient space to contain the largest single insert that can occur in word processing system 10.

Once the new node has been created, it is stored on the storage volume in step 530 and a new index entry is created in step 532. The new entry is then stored as the only entry in the index element component of the root node. After updating the root node control information in step 535, such as incrementing the number of levels in the index, the procedure is terminated in step 524 as above.

Figure 11E:
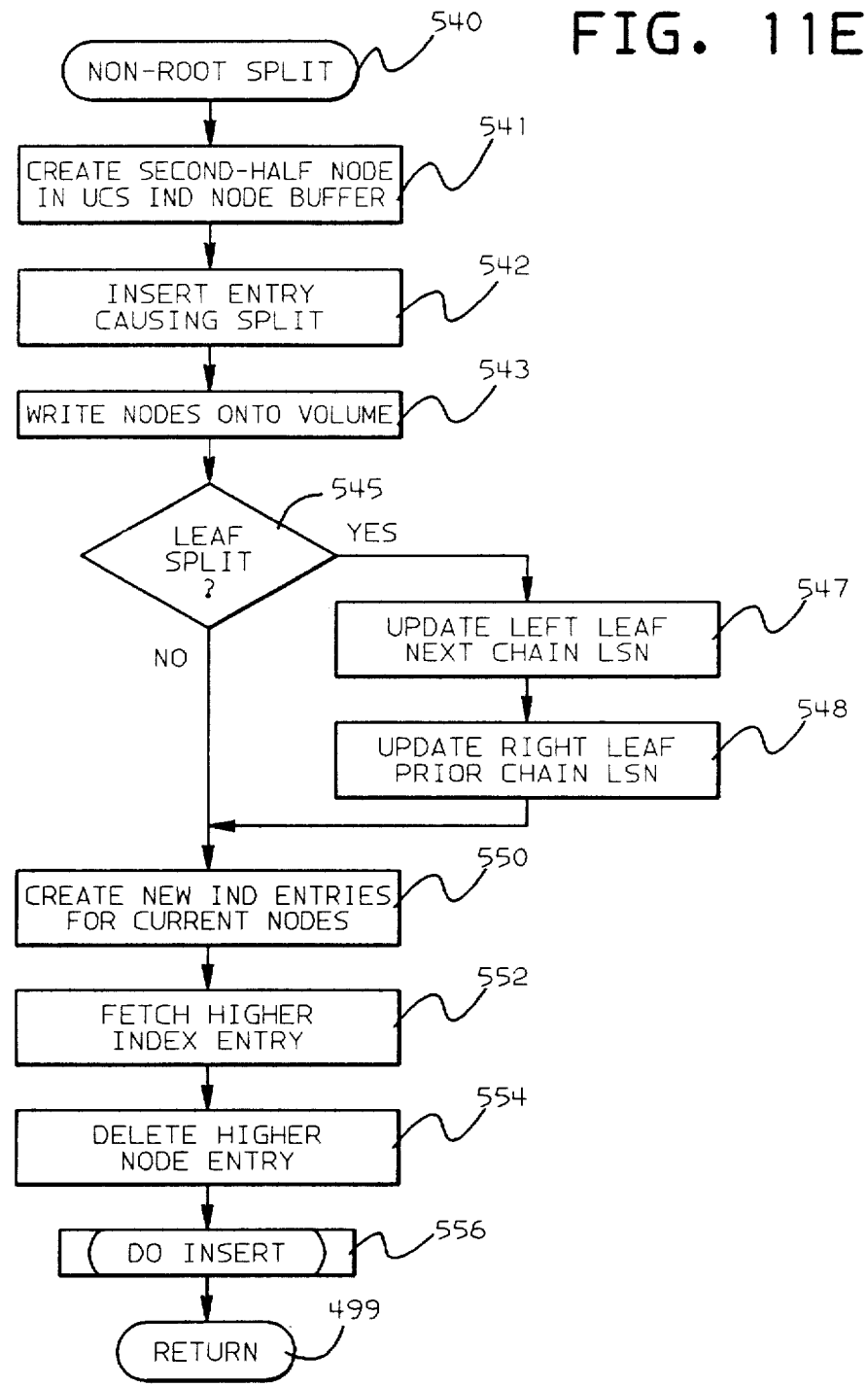

The final service routine procedure illustrated via flow diagram is the Non-Root Split procedure shown in FIG. 11E. The procedure is started with the non-root split service routine step 540. Since the procedure must create two index nodes at the current level where only one node existed before, the index element component of the current node is partitioned in step 51 among two new index nodes. The insert entry is handled in step 542, and in step 543 the new nodes are written onto the volume.

The node level is checked in step 545 to see if a leaf is being split. If so, the chains of the adjacent nodes are updated in steps 547 and 548. For an example of left leaf, right leaf, and chains, refer briefly to FIG. 6. If leaf node C (258) were being split, leaf node B (256) would be the left leaf and leaf node D (260) would be the right leaf in the above steps. FIG. 5A shows a leaf node chain 206 with prior leaf LSN 216 and next leaf LSN 218.

Returning to FIG. 11E, in step 550 new index entries are constructed for the two nodes. The higher index node containing the index entry which refers directly to the current node which was split is fetched in step 552 and the obsolete entry is deleted in step 554. As a final operation the insert procedure is performed to insert the new index entries in the higher node (with split as necessary).

In summary the present invention provides a method and apparatus for storing text onto a diskette or hard disk, recalling the text, and managing the data set indexes for the volume, while providing performance improvements for such diverse functions as, for example, normal text revision, document duplication, and fetching character generator font data for use in a display to display such text as Japanese Kanji characters.

Although several embodiments of the invention have been illustrated in the accompanying drawing and described in the foregoing detailed description, it will be understood that the invention is not limited to the embodiments disclosed but is capable of numerous arrangements, modifications and substitutions without departing from the scope of the invention.

What is claimed is:

1. In a word processing system including a system memory and a direct access storage device (DASD) storing an input text stream where text may be selected later for revision, a method for accessing a data set in the word processing system comprising:
   performing an open data set for access operation by first searching the current volume index on the DASD for a desired data set based on the data set name and a data set type;
   fetching a data set root index node into an interface control block in the storage access control block section of system memory;
   requiring the storage access control block to remain available at the same memory location for all subsequent accesses to the data set until a close data set operation is performed; and
   using the root node stored in the storage access control block for all subsequent searches and updates to the data set index.

2. A storage access method according to claim 1 further comprising:
   requiring each index node of a data set not to exceed a specified maximum length when updating the data set index for the inclusion of additional records or pages to the existing data set;
   requiring the root node of a data set index to be a unique index node at the highest existing level of said data set index;
   requiring each index node to contain index entries of either individual pages and records of the data set or of next lower level index nodes;
   building an additional next-to-highest index level where necessary to prevent the said root node from growing beyond the said maximum length specification;
   splitting a non-root level index node where necessary to prevent such node from growing beyond the said maximum length specification; and
   updating as necessary any higher level index nodes when some lower level index node is split.

3. A storage access method according to claim 2, further comprising:
   fetching a lower level index node into an index node buffer of an internal control block in the system memory when called for by an index entry found in a higher level node; and
   using the said lower level index node stored in said index node buffer of the internal control block for all subsequent searching of and sequential accessing to the index entries contained within said index node as long as said stored index node does not have to be replaced in said buffer.

4. A storage access method according to claim 3, further comprising:
   providing a chain of index entries for adjacent index nodes of equal level within each node of non-root level;
   using the chained index entries of an index node stored in said index node buffer for access to a next index node of the same level in any sequential access operations going beyond the index entries contained within said stored node, whereby a renewed access of and search in higher level nodes is superfluous; and updating as necessary said chained index entries contained in the adjacent nodes of a stored index node of non-root level when said stored node is being split.

5. A storage access method according to claim 1, 2, 3 or 4 further comprising:

requiring the root node of a data set index to contain an entry providing a data set profile comprising the data set name and a data set comment; and checking the data set name for the expected root node of a desired data set as soon as said root node is fetched into a storage access control block in system memory.

6. A storage access method according to claim 1, 2, 3, or 4 further comprising:

including a key information field within each page or record index entry contained in any index node at a leaf level of a data set index;

including a high key value information field within each leaf node index entry contained in any non-leaf level index node, wherein such a high key value corresponds to the highest value among the keys of the pages or records for which index entries are found in the leaf node pointed to by said leaf node index entry; and inserting page or record index entries for any additional pages or records of the data set only in selected positions of selected leaf index nodes such that keys of sequential page or record index entries appear in an ascending sequence within each leaf node as well as through all leaf nodes, whereby efficient search operations by key values of desired pages or records are feasible through the data set index.

7. A storage access method according to claim 3, further comprising:

providing a plurality of index node buffers within said internal control block sufficient in number to accommodate any index node operations as required for inserting additional record, page, leaf or intermediate index entries, building sub-root level index nodes, splitting a sub-root index node, or any other updating of data set index, and searching or sequential accessing index nodes of any sub-root level

* * * * *